US007840833B2

(12) United States Patent
Tripathi et al.

(10) Patent No.: US 7,840,833 B2
(45) Date of Patent: Nov. 23, 2010

(54) MANAGING A NODE CLUSTER (75) Inventors: Shailendra Tripathi, Karnataka (IN);
Tanmay Kumar Pradhan, Orissa (IN);
Akshay Nesari, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 397 days.

(21) Appl. No.: 12/022,067

(22) Filed: Jan. 29, 2008

(65) Prior Publication Data

US 2008/0184061 A1 Jul. 31, 2008

(30) Foreign Application Priority Data

Jan. 31, 2007 (IN) .......................... 210/CHE/2007

(51) Int. Cl.
*G06F 11/00* (2006.01)

(52) U.S. Cl. .......................................... 714/4; 709/223

(58) Field of Classification Search ....................... None
See application file for complete search history.

(56) References Cited

U.S. PATENT DOCUMENTS

| | | | | |
|---|---|---|---|---|
| 5,999,712 A * | 12/1999 | Moiin et al. | ................ | 709/220 |
| 6,192,401 B1 * | 2/2001 | Modiri et al. | ............... | 709/220 |
| 6,279,032 B1 * | 8/2001 | Short et al. | ................. | 709/209 |
| 6,363,495 B1 * | 3/2002 | MacKenzie et al. | ............ | 714/4 |
| 6,662,219 B1 * | 12/2003 | Nishanov et al. | ............ | 709/220 |
| 6,757,836 B1 * | 6/2004 | Kumar et al. | .................. | 714/4 |
| 7,231,543 B2 * | 6/2007 | Lee et al. | ....................... | 714/11 |
| 7,631,066 B1 * | 12/2009 | Schatz et al. | ................. | 709/224 |
| 2003/0023680 A1 * | 1/2003 | Shirriff | ....................... | 709/204 |
| 2005/0268154 A1 * | 12/2005 | Wipfel et al. | .................. | 714/4 |
| 2007/0016822 A1 * | 1/2007 | Rao et al. | ....................... | 714/4 |

FOREIGN PATENT DOCUMENTS

WO WO 2005/086756 9/2005

OTHER PUBLICATIONS

Sun Microsystems, Inc., "Sun Cluster Overview for Solaris OS", Apr. 2004.

* cited by examiner

Primary Examiner—Gabriel L Chu (57) ABSTRACT

A system for managing a cluster of nodes, the cluster comprising a plurality of groups of nodes, each node being associated with a vote, the system further comprising an arbitration device, the arbitration device being associated with a number of votes dependent on the number of nodes in the cluster, each node further being associated with a cluster manager, one of the cluster managers for each group being operable: if the group is in communication with the arbitration device, to determine whether the group has the greatest number of votes, including the votes of the arbitration device; if the arbitration device is operative, but the group is not in communication with the arbitration device, to determine whether the group meets the quorum without adjusting the quorum; and if the arbitration device is not operative, to determine whether the group meets the quorum after adjusting the quorum.

20 Claims, 7 Drawing Sheets

MANAGING A NODE CLUSTER

RELATED APPLICATION

This patent application claims priority to Indian patent application serial no. 210/CHE/2007, titled "Managing a Node Cluster", filed in India on 31 Jan. 2007, commonly assigned herewith, and hereby incorporated by reference.

BACKGROUND

A cluster is a group of interconnected processing devices, for instance a group of computers or servers, which can share data and other system resources. Each device in the cluster, also referred to as a node or a cluster member, can be configured to run one or more shared applications, resulting in a network of nodes that has increased reliability over single-node networks with respect to these applications. A cluster manager, instances of which run on each cluster member, is used to control the cluster, with the aim of ensuring that the cluster remains operational to the largest extent possible whilst preventing situations that could jeopardize the integrity of shared data.

Single-instance cluster applications run on only one cluster member at a time. To make this type of application highly available, the cluster manager provides a mechanism for starting the application on another cluster member in the event that the current member can no longer run the application. Multi-instance applications can run on multiple cluster members at the same time. A multi-instance application, by definition, is highly available because the failure of one cluster member does not affect the instances of the application running on other members.

One problem with known cluster arrangements is that, when a cluster partition occurs, for instance due to inter-node communication link failures, multiple sub-groups of nodes can be formed, each attempting to reform a new cluster having the same external identity as the original cluster. This can have serious consequences for the integrity of shared data, for instance when more than one sub-group attempts to run the same single-instance application.

In order to ensure data integrity, cluster managers have been developed that operate a voting scheme to determine which sub-group will form the new cluster and to prevent the remaining sub-groups from forming clusters. Votes are allocated to each sub-group and are based on the number of nodes in the sub-group. The number of votes required for forming the new cluster, referred to as obtaining 'quorum', is generally required to be at least half of the original votes available, such that the cluster can be reformed only by the largest sub-group(s) To cope with the situation in which two sub-groups have equal votes, referred to as the 'split-brain' scenario, an arbitration device is provided, an example of which is a quorum server, connected to all nodes in the cluster. The quorum server acts as a virtual cluster member having one vote. Therefore, following a cluster partition into two equally-sized sub-groups, the quorum server allocates its vote to one of the sub-groups, allowing that sub-group to achieve quorum and reform the cluster, while the other group is denied quorum and cannot start a cluster.

However, even in arrangements having a quorum server, for the cluster to be reformed by a sub-group, it is still required that the sub-group is made up of at least half of the nodes that were present in the original cluster. This is to ensure that, in the case that a group of nodes becomes separated from the remaining nodes in the cluster as well as the quorum server, it cannot reform the cluster unless it has a clear majority of the nodes, thus avoiding multiple sub-groups from being formed.

Accordingly, in conventional cluster arrangements, the cluster can be prevented from continuing in cases where this is not necessary, for instance in the case that the cluster is partitioned, as a result of one or more failures, into more than two sub-groups. Therefore, in conventional systems, high cluster availability may be compromised to preserve data integrity.

BRIEF DESCRIPTION OF THE DRAWINGS

Embodiments of the invention will now be described by way of example with reference to the accompanying drawings, in which.

DETAILED DESCRIPTION

Figure 1:
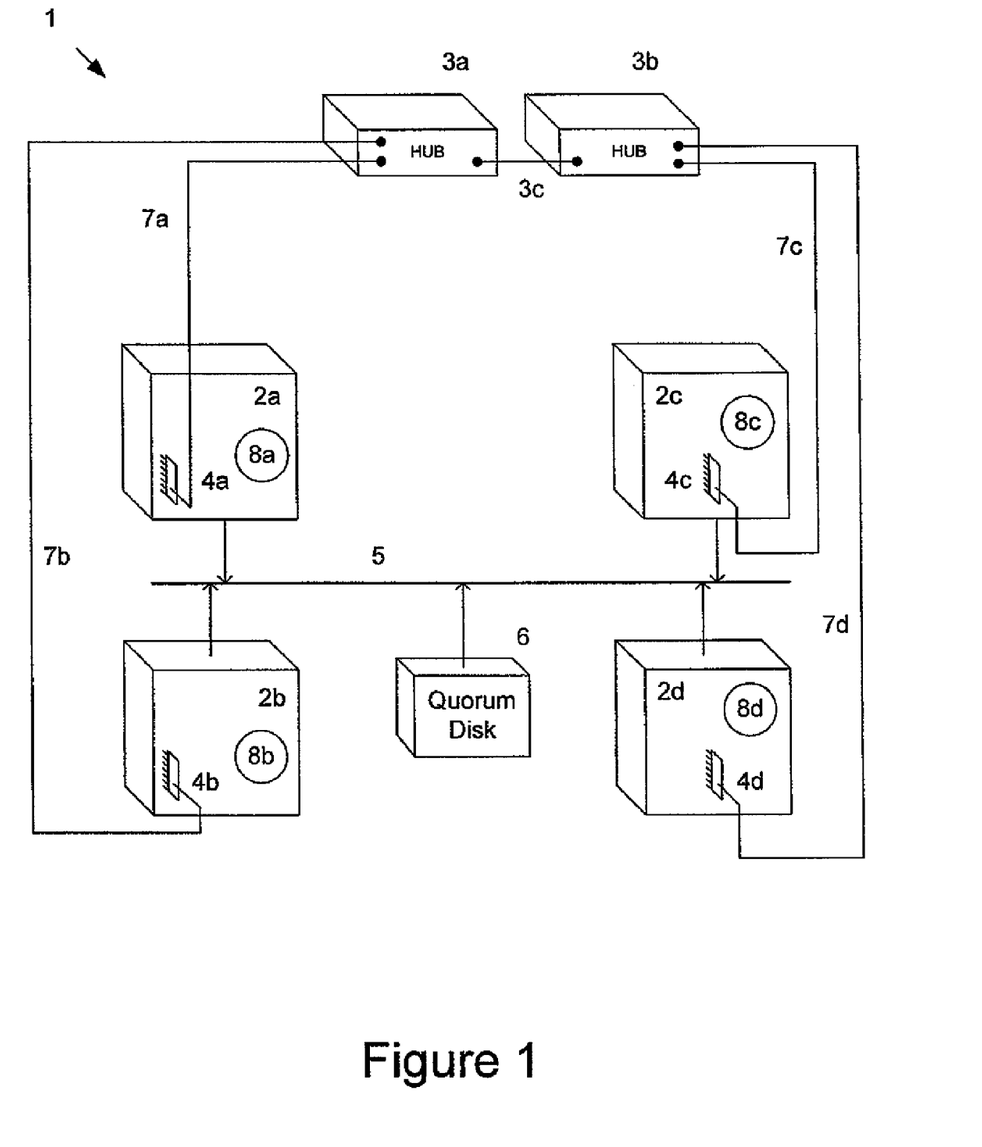
FIG. 1 illustrates a cluster arrangement according to an embodiment of the present invention.

Referring to FIG. 1, a cluster 1 according to the present invention includes first, second, third and fourth servers, 2a, 2b, 2c, 2d, also referred to herein as nodes or cluster members, interconnected via first and second interconnected network hubs 3a, 3b. The first and second servers 2a, 2b are connected to the first hub 3a and the third and fourth so servers 2c, 2d are connected to the second hub 3b. The first and second network hubs 3a, 3b are interconnected via a communication link 3c. Each node 2a, 2b, 2c, 2d comprises a respective network adaptor 4a, 4b, 4c, 4d for enabling connection of the nodes to the hubs 3a, 3b and a port (not shown) for connecting to a shared storage bus 5 to which a quorum disk 6 is connected. The nodes 2a-d are connected to their respective hubs 3a, 3b via respective communication links 7a-d.

In the present example, the ports are small computer system interface (SCSI) ports and the shared storage bus 5 provides a SCSI connection between the servers 2a-d and the quorum disk 6. The quorum disk is, in the present example, a hardware based Redundant Array of Inexpensive Disks (RAID), although other storage could be used, for instance software based RAID systems or any hard disk drive that can process the SCSI protocol, including, for example, Fibre Channel based disks.

The SCSI protocol provides for sense keys that can distinguish between different kinds of connection failure, such as SCSI to host system interface failure and data path failure.

It will be understood that the first, second, third and fourth servers 2a, 2b, 2c, 2d are conventional commercially available servers having all of the hardware, operating system software and application software required to perform their respective functions.

Each of the first, second, third and fourth servers 2a, 2b, 2c, 2d have stored in their memory an instance of a cluster manager application 8a-d for controlling the cluster 1.

The voting scheme by which the cluster manager determines whether a cluster can continue and by which it arbitrates between sub-groups capable of reforming the cluster requires the current votes C attained by a cluster to be greater than or equal to the quorum votes Q defined for the cluster. In the present example, each node in the cluster is allocated one node vote, making the total number of node votes, Vn, equal to the number of nodes, N, in the cluster. The quorum disk is allocated N−1 votes, Vq. The expected votes E for a particular cluster therefore becomes:

$$E=Vn+Vq=2N-1.$$

Quorum votes Q are defined as $$Q=\text{round\_down}((E+2)/2)=\text{round\_down}((2N+1)/2)=N,$$

where the function 'round down' returns the result rounded down to the nearest integer.

Therefore, even a single node having access to the quorum disk can achieve quorum and form the cluster where the other N−1 nodes are down, since Q=N and the quorum disk vote Vq=N−1, so current votes C=1+(N−1)=N, which equals the required quorum.

Figure 2:
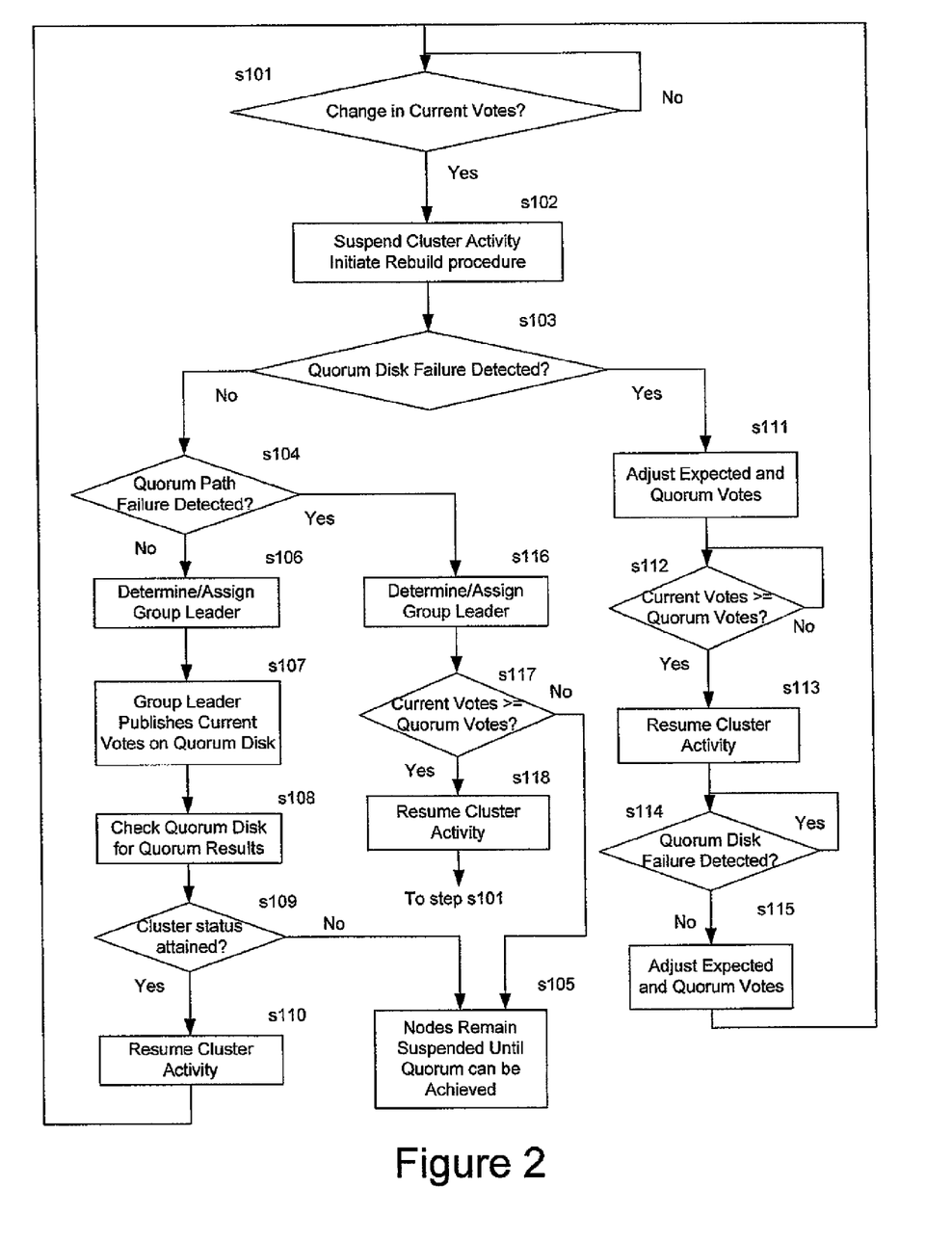
FIG. 2 is a flow diagram illustrating the procedure performed by the cluster manager according to embodiments of the invention.

FIG. 2 is a flow diagram illustrating the steps performed by the cluster manager according to the present invention following a detected change in the number of current votes C in the cluster 1.

In general terms, the nodes and the quorum disk are participating entities in overall operations. There is a periodic exchange of messages between the participating entities which determines the health of the cluster. After a failure to receive a message from an entity, a cluster rebuild takes place. As part of this overall process, the current state of the cluster sub-groups is determined and based upon this appropriate decisions are taken to make one working cluster out of the various sub-groups.

Each node 2a-2d in the cluster 1 continually monitors the number and status of other nodes in the cluster via a series of heartbeat messages sent between the nodes 2a-2d and via flags and other information stored by the nodes 2a-2d on the quorum disk 6. Each node can therefore determine the number of expected votes E and accordingly the quorum votes Q, as well as the current votes C in the cluster 1.

The quorum disk 6 also stores the number of expected votes E and current votes C in the cluster 1, provided by the nodes 2a-2d, such that the nodes can ensure that they agree on these values.

The expected number of votes E is not altered unless it is reliably determined that the quorum disk has failed.

Each node 2a-2d, under the control of the cluster manager running on the nodes can therefore determine when a reduction in the number of current votes C occurs, indicating a failure (step s101). In this event, cluster activity is suspended and the cluster rebuild procedure is triggered (step s102).

There are two main types of failure. The first type includes failure of a link or node, for example as a result of a kernel hang or complete kernel failure in a node or any number of other cluster communication, hardware or software failures.

For example, in the system illustrated in FIG. 1, the failure may be a failure in the communications link 3c interconnecting the first and second network hubs 3a, 3b, resulting in a partition of the cluster 1 into a first sub-group comprising the first and second servers 2a, 2b and a second sub-group comprising the third and fourth servers 2c, 2d.

As another example, it may be failure of the link 7d between the second hub 3b and the fourth node 2d, resulting in a partition of the cluster 1 into a first sub-group comprising the first, second and third servers 2a, 2b, 2c and a second sub-group comprising just the fourth server 2d.

These alternative examples will be considered in further detail below.

The second main type of failure is quorum disk failure, which has two further subtypes. In the first subtype, the quorum disk is reliably known to have failed. In the second subtype, there is an apparent quorum disk failure, but it is not reliably known that the quorum disk has failed—for example, a link 5 to the quorum disk fails.

By virtue of the SCSI connection 5 between each node 2a-d in the sub-group 30 and the quorum disk 6, each node 2a-d can determine whether the quorum disk 6 has failed or, alternatively, whether the communication path 5 with the quorum disk 6 has failed. Returning to the flowchart of FIG. 2, it is firstly determined whether the quorum disk 6 has failed (step S103). If the quorum disk 6 has not failed, it is then determined whether the communication path 5 with the quorum disk has failed (step S104).

In the event that the failure detected is of type 1, in other words that there is neither a quorum disk nor a quorum path failure, then this indicates that the current cluster votes C have changed as a result of a change in the number of nodes in the cluster 1, rather than a failure in communications with the quorum disk 6.

Figure 3:
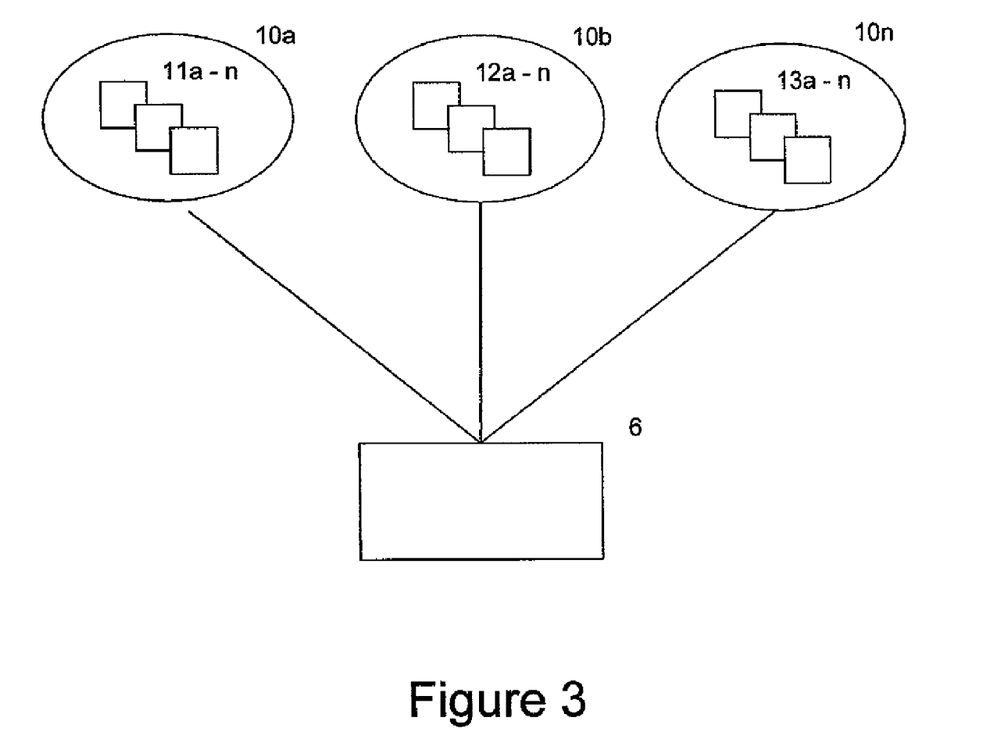
FIG. 3 illustrates a cluster arrangement after one or more failures has caused the formation of a plurality of cluster sub-groups.

FIG. 3 is a diagram illustrating the general case of a system in which one or more failures have occurred, partitioning the system into a number of subgroups 10a-n, each subgroup having a plurality of nodes 11a-n, 12a-n and 13a-n respectively, all of which continue to be separately in communication with the quorum disk 6. In this case, the cluster manager running on the first group of nodes 11a-n determines that a cluster partition into multiple subgroups may have occurred and therefore arbitration is required to determine which subgroup 10a-n should reform the cluster 1. The cluster manager applications running on the nodes 11a-n in the first subgroup together assign a node in their sub-group 10a as the group leader of the subgroup 10a or determine which node is the current group leader if a group leader has been previously assigned (step 106). For example, the node that detected the failure becomes the group leader.

Corresponding steps are taken in the other subgroups and the group leader for each subgroup 10a-n publishes the current votes C allocated to that sub-group on the quorum disk (step S107), checks the results published by other sub-groups on the quorum disk 6 (step S108) and determines whether their respective current votes C are enough for the sub-group to form the cluster (step S109). If so, the sub-group resumes cluster activities (step S110) and the process is restarted from step S101. If, on the other hand, a subgroup 10a-n cannot attain cluster status, the nodes 11a-n in the sub-group 30 continue to suspend all cluster activities until such a time as quorum can be attained (step S105). If a quorum disk path failure is detected at step s104, then one or more subgroups 11a-n would no longer have the quorum vote Vq. In this case, since the quorum disk 6 is still operational, one of the remaining subgroups may still be able to attain cluster status. In this case, the nodes affected by the quorum disk path failure would remain suspended until they can achieve quorum (step S105), for example once a path repair has been effected.

Figure 4:
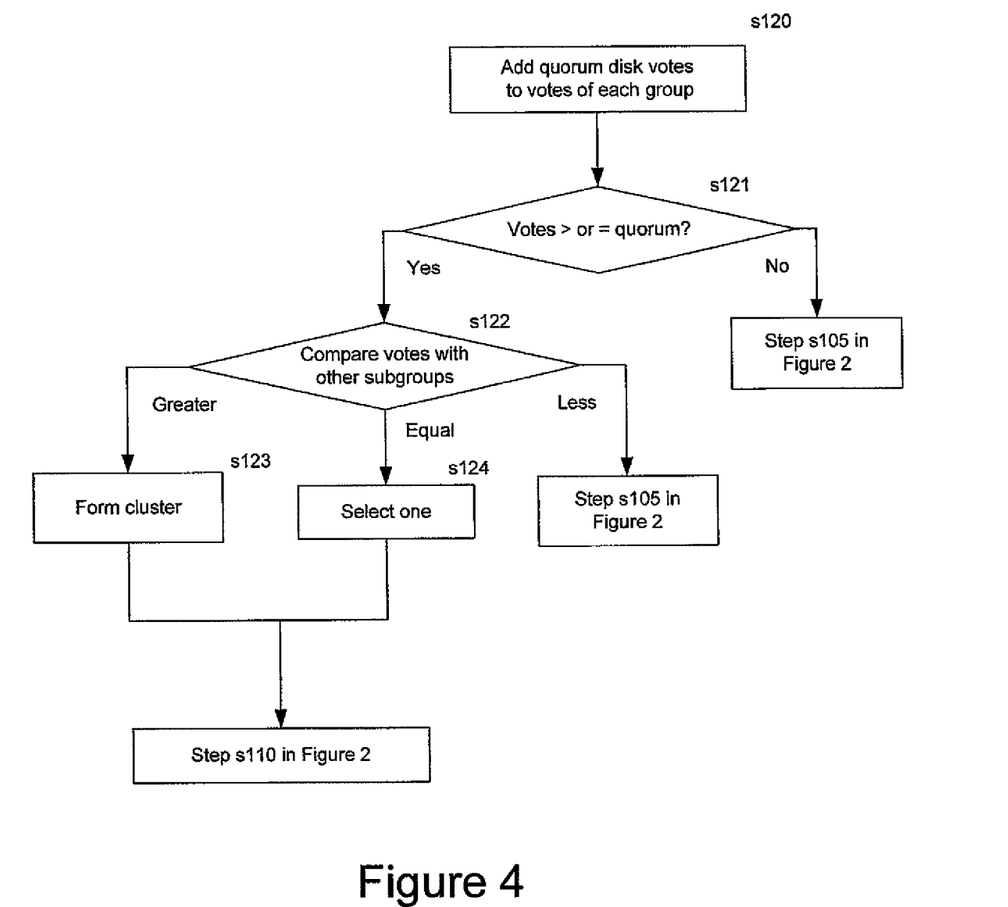
FIG. 4 is a flow diagram illustrating aspects of the procedure of FIG. 3 in more detail.
Figure 5:
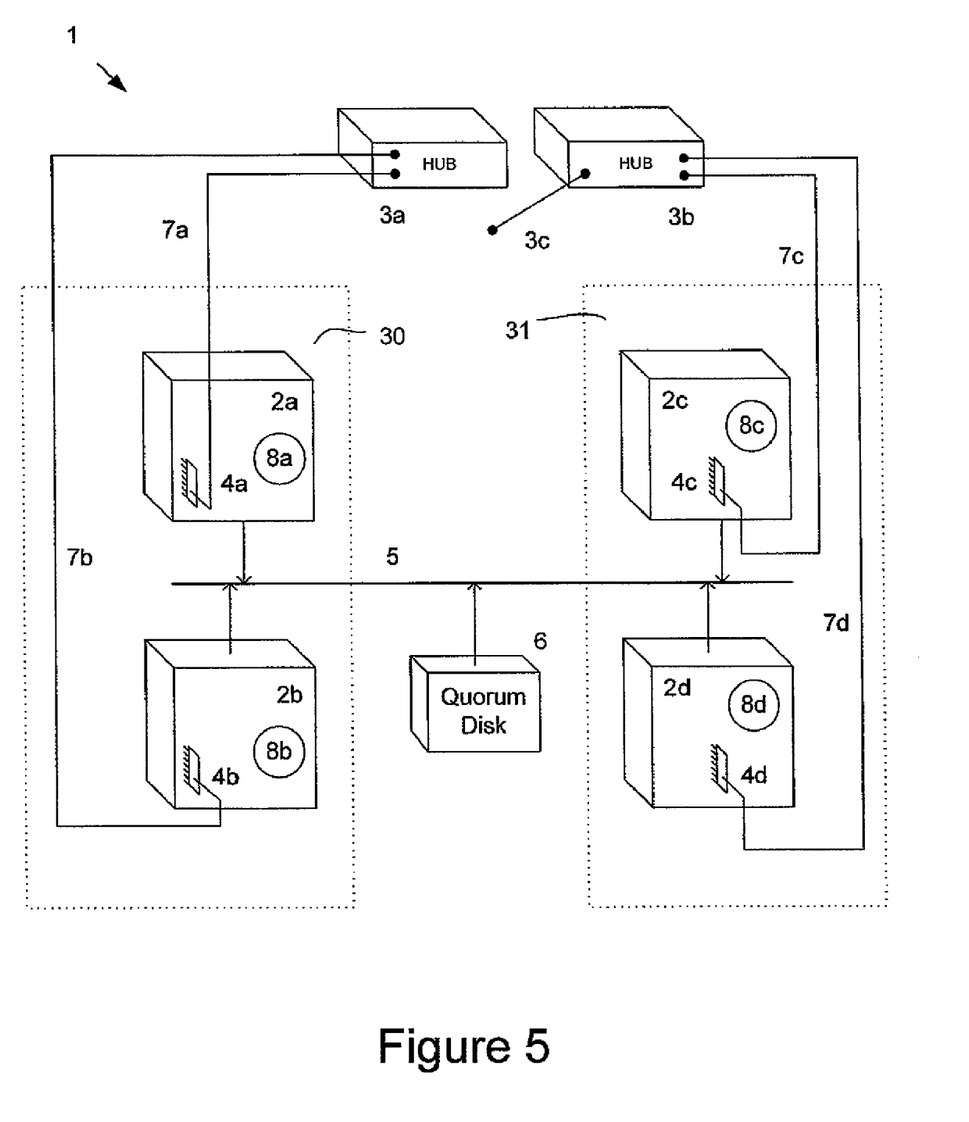
FIG. 5 illustrates the cluster arrangement of FIG. 1 after failure of a link has caused the creation of two subgroups having an equal number of nodes.
Figure 6:
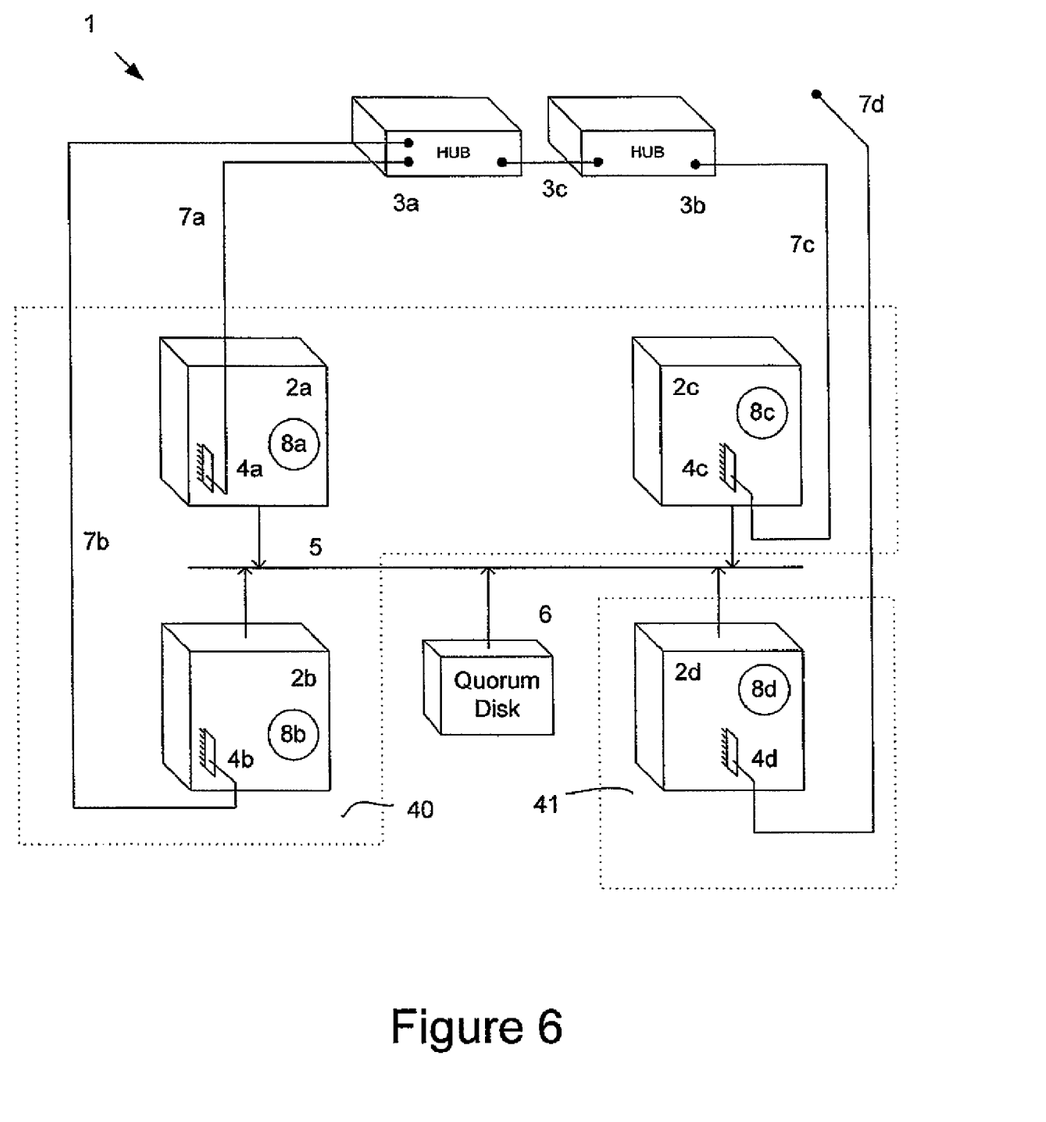
FIG. 6 illustrates the cluster arrangement of FIG. 1 after failure of a link has caused the creation of two subgroups having an unequal number of nodes.

The procedure for determining if cluster status has been attained (step s109) is explained in more detail with reference to FIG. 4, and is further illustrated with reference to FIGS. 5 and 6, illustrating the examples of link failure mentioned above.

The first example referred to above is illustrated in FIG. 5, where as a result of failure of link 3c, two subgroups 30, 31 remain, each in communication with the quorum disk In this case, assuming nodes 2a and 2c are nominated as group leaders, the cluster managers 8a, 8c of the group leader nodes of each subgroup temporarily add the quorum disk votes Vq to the votes of each subgroup as published on the quorum disk (step s120).

In this case, the number of nodes N in the cluster 1 before the communication failure was 4 and therefore the expected cluster votes, E, is 7 (N plus Vq), where the quorum disk is assigned 3 votes (Vq) and the number of quorum votes Q is 4. The current votes C (node votes+quorum disk votes) before the communication failure was 7, and after the communication failure the current votes C for each of the first and second sub-groups is reduced to 5.

So in this example, adding the quorum disk votes to the sum of the node votes for each subgroup results in a total of 5 votes for each group. The cluster manager for each subgroup determines whether this number of votes exceeds the quorum votes Q (step s121). If it does not, the subgroup cannot form the cluster (step s105 in FIG. 2). If it does, then the cluster manager for each subgroup compares the number of votes with those for the other subgroups (step s122). If it has more votes than any other subgroup, it forms the cluster (step s123) and resumes cluster activity (step s110). If it has less votes than another subgroup, the nodes remain suspended (step s105 in FIG. 2).

If it has the same number of votes as another subgroup (this being the highest number of votes), it decides based upon its algorithm which group to select and selects this group (step s124) and resumes cluster activity (step s110). One simple algorithm is that the subgroup which first published is selected.

However, other algorithms may also be used to perform this selection.

In the example illustrated in FIG. 5, the number of quorum votes Q is exceeded by both subgroups. Both subgroups also have equal votes, so either of these subgroups can be selected to form the cluster.

Applying the above algorithm to the second example illustrated in FIG. 6, one subgroup 40 has three nodes while the other 41 has only one node. The same procedure applies as above, with 3 votes being added to the first subgroup and three to the second subgroup, giving each a quorum. However, the first subgroup has a total of 6 votes (3 node votes+Vq) as opposed to only 4 for the second subgroup (1 node vote+Vq), so the first subgroup forms the cluster while the second subgroup shuts down.

Figure 7:
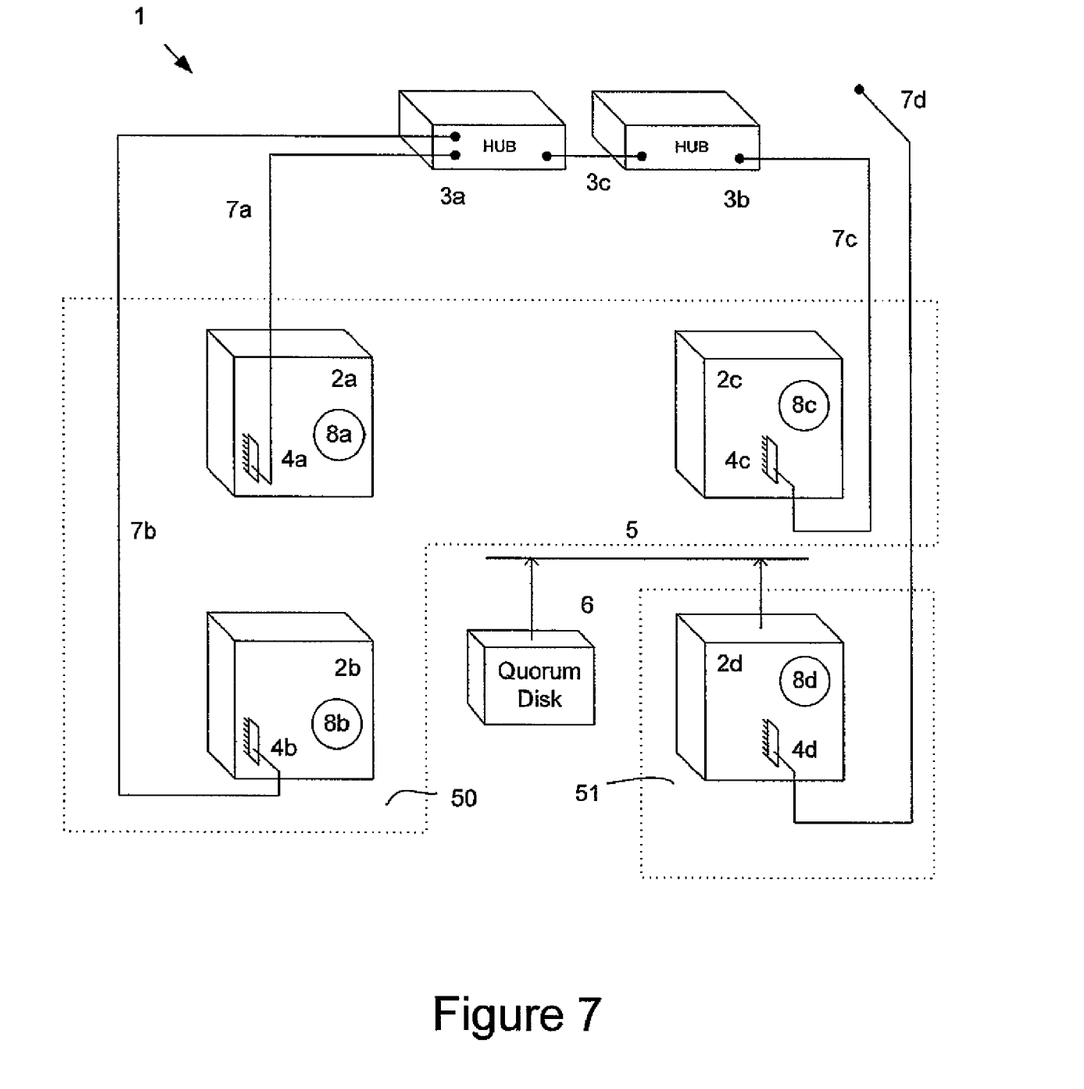
FIG. 7 illustrates the cluster arrangement of FIG. 1 after failure of a link has caused the creation of two subgroups having an unequal number of nodes and the first subgroup has suffered a link failure to the quorum disk.

FIG. 7 illustrates a third example in which there is a path failure between the first subgroup 50 and the quorum disk 6. In this example, referring to FIG. 2, following detection of a change in current votes, it is determined at step s104 that there is a quorum path failure. A group leader is again assigned for each subgroup (step s116) and the cluster manager for each subgroup determines whether the current votes equal or exceed the quorum (step s117). Since there has only been a quorum disk path failure as opposed to a quorum disk failure, it is possible that one of the subgroups can attain quorum and form the cluster. There is therefore no need to adjust the expected or quorum votes.

In this example, the quorum is 4, and the current votes for the first subgroup 50 comprise the node votes only, namely 3 votes. This is less than the required quorum so the first subgroup 50 cannot form the cluster and its nodes remain suspended (step s105). The first subgroup could form the cluster in the event that it retained all of the nodes from the original cluster, even if it was no longer in communication with the quorum disk.

For the second subgroup 517 comprising a single node, the current votes comprise a single node vote and the quorum disk vote of 3, totalling four and therefore meeting the required quorum. The single node can therefore form the cluster.

Referring again to FIGS. 1 and 2, if, at step S103, quorum disk failure was detected, this indicates to the cluster manager of the first subgroup that, even if the cluster 1 is partitioned, other sub-groups would not be allocated the quorum disk votes Vq. The expected votes E and quorum votes Q are therefore adjusted to take account of the fact that the quorum disk vote Vq will no longer be available (step S111). Accordingly, the expected votes, E, becomes $$E=Vn=N=4$$

and quorum votes, Q, become $$Q=\text{round\_down}((E+2)/2)=\text{round\_down}((4+2)/2)=3.$$

It is then determined whether the current votes C available in the sub-group are equal to or greater than the quorum votes Q (step S112). If so, cluster activity can be resumed (step S113). Otherwise, cluster activity continues to be suspended until the current votes are enough for the cluster 1 to have quorum, which it does in the present example. Once the quorum disk 6 is again operational, for instance as a result of repair or replacement of a faulty quorum disk 6 by a system operator (as determined at step S114), a vote adjust-up process is performed by the cluster manager to increase the number of expected votes E and quorum votes Q to include the quorum disk vote Vq (step S115).

The process is then be restarted from step S101.

Embodiments of the present invention therefore provide a method by which the cause of a failure in communications with an arbitration device can be determined. Depending on the cause, procedures are applied that enable subgroups of nodes to seek to rebuild the cluster, ensuring not only that a selected subgroup can form a cluster knowing that it will be the only subgroup forming the cluster, but also allowing a subgroup comprising only a single node to form the cluster in the appropriate circumstances.

The invention claimed is:

1. A method of managing a cluster of nodes, the cluster comprising a plurality of groups of nodes, each node being associated with a vote, wherein each group is in communication with an arbitration device, the arbitration device being associated with a number of votes dependent on the number of nodes in the cluster, the method comprising:
   for each group, adding the votes associated with the arbitration device to the votes associated with the group;
   determining which of the groups of nodes has the greatest number of votes; and
   assigning the group with the greatest number of votes to function as the cluster.

2. A method according to claim 1, wherein in the event that more than one group comprises the group having the greatest number of votes, selecting one of the groups to function as the cluster.

3. A method according to claim 1, wherein the act of determining which of the groups of nodes has the greatest number of votes is carried out for groups that that meet or exceed a predetermined quorum.

4. A method according to claim 3, wherein the predetermined quorum in N, where N is the total number of nodes in the cluster.

5. A method according claim 1, wherein each node is associated with one vote and the arbitration device is associated with N−1 votes, where N is the total number of nodes in the cluster.

6. A method of managing a cluster of nodes, at least one node in the cluster being connectable, via a communications path, to an arbitration device for use in resolving conflicts between nodes in the formation of the cluster, the method comprising:

detecting a failure in communications between the at least one node and the arbitration device;

determining whether the failure is a failure of the arbitration device;

determining whether the failure is a failure of the communications path between the at least one node and the arbitration device; and determining whether to adjust a threshold that includes a value associated with the arbitration device based on the determining of whether the failure is the failure of the arbitration device and the determining of whether the failure is the failure of the communications path.

7. A method according to claim 6, further comprising, in the event that the failure is a failure in the communication path, determining whether the number of votes associated with each subgroup of nodes formed as a result of the failure reaches a predetermined threshold.

8. A method according to claim 7, comprising suspending one or more activities of the at least one node in a subgroup of nodes when the number does not reach the predetermined threshold.

9. A method according to claim 7, wherein the number of votes associated with a subgroup of nodes that cannot access the arbitration device does not include votes associated with the arbitration device.

10. A method according to claim 7, wherein the number of votes associated with a subgroup of nodes that can access the arbitration device includes votes associated with the arbitration device.

11. A method according to claim 6, wherein the cluster is associated with the threshold, the method comprising:

in response to a determination that the failure is the failure of the arbitration device, adjusting the threshold by omitting the value associated with the arbitration device.

12. A method according to claim 11, further comprising determining a number of nodes in the cluster after the failure;

allocating to the cluster a value dependent on the determined number of nodes in the cluster after the failure; and comparing the allocated value with the adjusted threshold.

13. A method according to claim 12, further comprising:

resuming operation of the cluster if the allocated value is greater than or equal to the adjusted threshold.

14. A method according to any one of claims 11, comprising adjusting the threshold to take account of the value associated with the arbitration device in the event that the arbitration device becomes operational.

15. A method according to any one of claims 11, wherein the arbitration device comprises a quorum disk and the threshold comprises a quorum value that determines the number of nodes required to form a cluster.

16. A method according to any one of claims 6, comprising determining that the failure results in the cluster being partitioned into a plurality of subgroups, each of the subgroups being in communication with the arbitration device.

17. A method according to claim 16, wherein one of the nodes in a subgroup sends the current votes for the subgroup to the arbitration device so that the current votes are accessible to all of the subgroups.

18. A method according to claim 17, wherein each of the subgroups determines from the current votes for the other subgroups whether it should operate as the cluster.

19. A method according to claim 18, comprising adding votes associated with the quorum disk to the votes associated with each of the subgroups to determine which of the subgroups is to operate as the cluster.

20. A system for managing a cluster of nodes, the cluster comprising a plurality of groups of nodes, each node being associated with a vote, the system further comprising an arbitration device, the arbitration device being associated with a number of votes dependent on the number of nodes in the cluster, each node further being associated with a cluster manager, one of the cluster managers for each group being operable:

if the group is in communication with the arbitration device, to determine whether the group has the greatest number of votes, including the votes of the arbitration device;

if the arbitration device is operative, but the group is not in communication with the arbitration device, to determine whether the group meets the quorum without adjusting the quorum; and if the arbitration device is not operative, to determine whether the group meets the quorum after adjusting the quorum.

* * * * *

UNITED STATES PATENT AND TRADEMARK OFFICE
CERTIFICATE OF CORRECTION

PATENT NO. : 7,840,833 B2  
APPLICATION NO. : 12/022067  
DATED : November 23, 2010  
INVENTOR(S) : Shailendra Tripathi et al.

Page 1 of 1

It is certified that error appears in the above-identified patent and that said Letters Patent is hereby corrected as shown below:

In column 7, line 1, in Claim 3, delete "that that" and insert -- that --, therefor.

Signed and Sealed this  
Fifth Day of April, 2011

David J. Kappos  
*Director of the United States Patent and Trademark Office*